United States Patent Office 3,333,014
Patented July 25, 1967

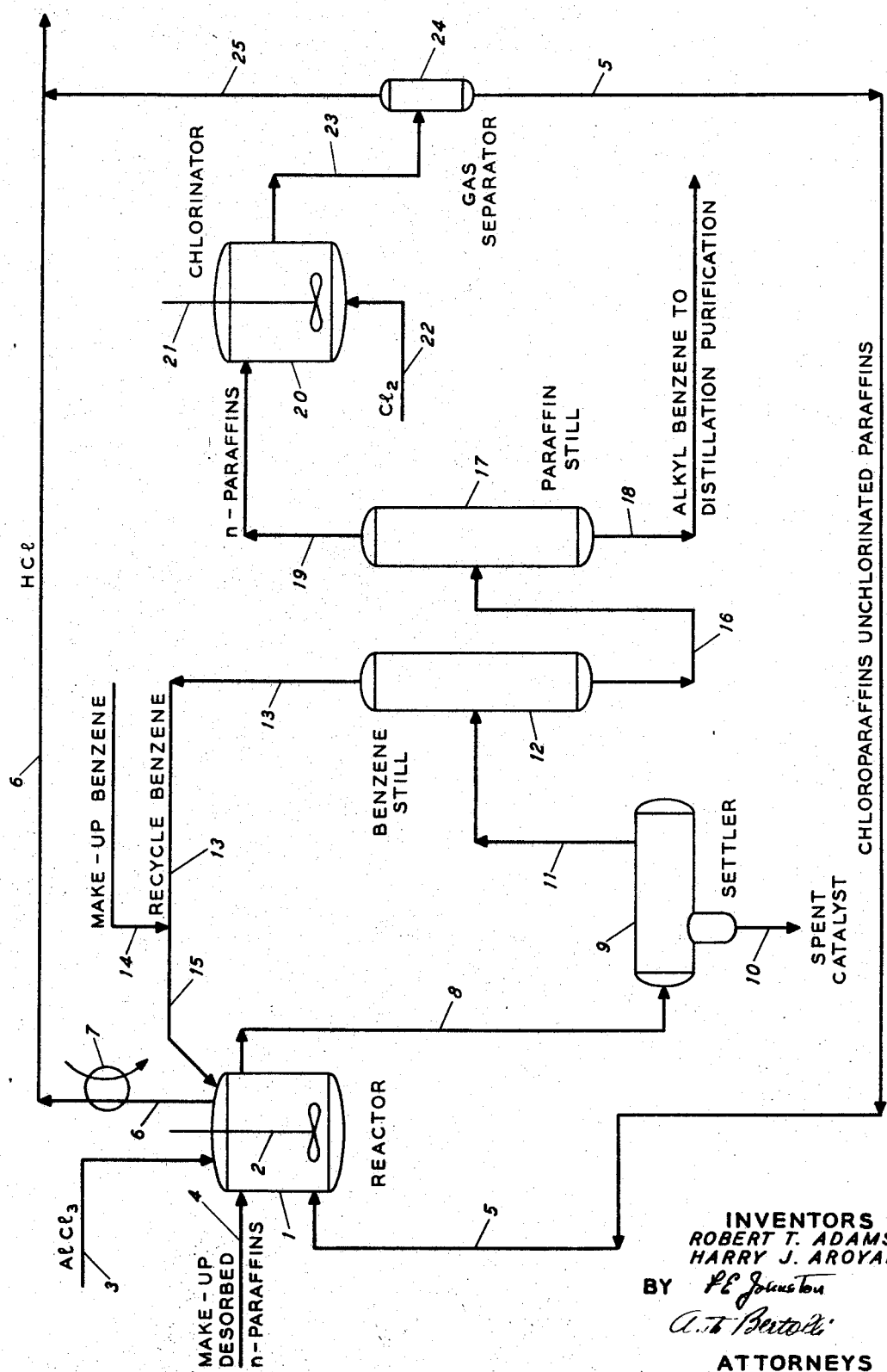

3,333,014
PROCESS FOR PREPARING BIODEGRADABLE
DETERGENT ALKYLATE
Robert T. Adams, Lafayette, and Harry J. Aroyan, San
Rafael, Calif., assignors to Chevron Research Company, a corporation of Delaware
Filed July 3, 1963, Ser. No. 292,689
13 Claims. (Cl. 260—671)

The present invention relates to a process for producing biologically soft detergent alkylaromatic compounds. Pursuant to the invention there is provided a more effective process for the production of an alkylate which, when sulfonated and neutralized, for example with sodium hydroxide, yields a more biodegradable sodium alkylaryl sulfonate detergent, characterized by a lowered content of undesirable refractory contaminants, the presence of which cause undesirable properties, including corrosivity.

Alkylaromatics in which the alkyl groups are essentially straight chains are convertible by sulfonation and neutralization into a product asserted to be superior in certain respects to alkylarylsulfonate detergents, which have a more complex alkyl group, as typified by the sodium polypropylenebenzene sulfonates, and which presently form a large share of the synthetic detergent market.

Thus, it appears that regardless of the ever-increasing content of pollutants generally finding their way in sewage systems, the sodium polypropylenebenzene sulfonate type of detergent is at least partly blamed for interfering with proper and efficient processing of sewage. Because of their branched structure, these detergents are biologically hard, i.e. are resistant to bacterial attack and degradation into less complex, simple molecules. Some of these are asserted to destroy bacteria useful in the digestion of organic pollutants and to pass unchanged through the sewage plant, causing undesirable foaming on the way, and thence to find their way into surface, as well as underground, waters, thus contaminating them.

Therefore, it appears that regardless of the degree of culpability of the polypropylenebenzene sulfonate type detergent, it is desirable to produce a detergent alkylate which is more biodegradable, i.e. more readily digested by bacteria, and which appears in sewage waters in low concentrations, or not at all, in the form of its original molecule.

In preparing the detergent alkylate of the present invention, the well-known Friedel-Crafts condensation reaction is utilized. According to the reaction, straight-chain monochloroparaffins, or n-alkyl chlorides, containing 9 to 18 carbon atoms, in the presence of anhydrous aluminum chloride or other equivalent Friedel-Crafts catalyst, condense with an aryl hydrocarbon, e.g. benzene, with the formation of hydrogen chloride.

In making detergent alkylate it is desirable that only one hydrogen atom of the aromatic nucleus is replaced with one alkyl group. Accordingly, there is generally used an excess of aryl compound ranging from 2 to 25 mols per mol of alkyl chloride, and preferably 5 to 15 mols of aryl compound per mol of n-alkyl chloride or chloroparaffin. The excess aryl compound can be recovered and reused in the process.

The aryl compound can be mononuclear in structure, for example benzene or its lower alkyl derivatives, for example toluene, ethylbenzene, or xylene; or it may be polynuclear, as exemplified by naphthalene.

The alkylating alkyl chloride component is usually obtained as a mixture by the chlorination of suitable straight-chain hydrocarbon or paraffin stock whereby upon alkylation an alkylate of the aryl compound is produced, the alkyl group of which corresponds in structure and carbon content to that of the alkyl chloride alkylating agent. Suitable hydrocarbon stocks for chlorination are petroleum distillates which, in the refining of petroleum, generally fall between the gasoline and lubricating oil fractions, i.e. the kerosene fraction. In general, a suitable petroleum distillate will boil in about the range 300° F. to 600° F., corresponding to a carbon content of 9 to 18 carbon atoms. Since straight-chain material is required, the petroleum distillate will be comparatively rich in normal paraffins, with relatively lower contents of cyclic and isoparaffinic materials. A good source of the petroleum distillate is paraffin-based crude oil, such as the Pennsylvania oils and those obtained from the Minas fields in Sumatra.

In order to make the normal paraffin material, used in the chlorination step to produce chloroparaffin for the alkylation step with aryl compound, even more desirable, i.e. a more linear or straight-chain paraffinic material, it is subjected, prior to chlorination, to a separation process. In this process, the normal paraffins are selectively separated from isoparaffins, aromatics, and cyclic paraffins. Presently favored separation processes involve the use of molecular sieves of natural or synthetic zeolites, for example calcium alumino silicates.

As indicated, molecular sieve separation processes are well known, and a good summary of these is given in U.S. Patent No. 3,070,542 to Asher. As described in that patent, the zeolites have crystal patterns which form structures characterized by a large number of cavities or pores. The pores or holes may vary in diameter from 3 to 6 A. to 8 to 15 A. For the detergent range hydrocarbons, a suitable size is around 5 A., as typified by Linde 5A molecular sieves. The straight-chain hydrocarbon molecules in the feed fed to the molecular sieve have affinity for the adsorbent sieve and are adsorbed in the pores or holes.

Variouse modifications of molecular sieve processes have been proposed. One such modification involves vapor phase operation at high temperatures of the order of 700–800° F. Another modification permits operation at lower temperatures of about 400° F. in the liquid phase. Normal hydrocarbons may be stripped or desorbed from the sieve by vacuum treatment or by the use of a displacing or desorbing medium to obtain a more linear desorbate than feed charged to the molecular sieve. An improvement in the desorbing step is described and claimed in the aforementioned patent, which involves passing the hydrocarbon mixture, together with a displacing medium, into a molecular sieve saturated with displacing medium. The desorbate obtained as above described is then chlorinated to produce chloroparaffin which are in turn condensed with aryl compound.

In addition to the preliminary molecular sieve conditioning treatment of paraffinic feed, the manner of performing the initial chlorination operation and the conditions used for the preparation of the alkyl chloride component are significant.

Thus, it is generally desirable to use such conditions in the chlorination step which will maximize the formation of monochloroparaffins and minimize the formation of polychlorides, for example an alkane in which two hydrogen atoms have been substituted with two chlorine atoms.

Accordingly, the chlorination operation is generally conducted under conditions, and with the use of apparatus, such as to minimize dehydrochlorination of the resulting alkyl chlorides, which produces hydrogen chloride and olefins, the latter reacting with additional chlorine to form undesirable polychlorides. It has, accordingly, been proposed to use special apparatus, such as glass-lined chlorination vessels to inhibit dehydrochlorination. Furthermore, it has been proposed to carry out the chlorination reaction in a manner such as to produce a chlorinated product in which the organically bound chlorine content is far less than would obtain if chlorine were combined with all of the hydrocarbon molecules on the basis of one chlorine atom per molecule of hydrocarbon. Usually, the degree of chlorination is expressed in terms of mol percent chlorination of the hydrocarbon stock and conventional chlorination processes are carried out to the extent of converting 10–50%, more usually 15–30%, of the paraffins.

A satisfactory chlorination process involves contacting chlorine gas with a liquid mass of the paraffinic material at a temperature in the range 75–250° F., and a pressure of 15–65 p.s.i.a. Low chlorination temperatures, for example 100–150° F., preferably 110–130° F., can be used by activating the chlorination reaction with light, and higher temperatures, for example 150–200° F., preferably 160–180° F., where no activation is used.

It is advantageous to conduct the chlorination in stages, that is by using an amount of chlorine, i.e. 0.1 to 0.15 mol per mol of paraffin, to give 10–15% chlorination in a first stage. Hydrogen chloride and excess chlorine are then removed, and the partially chlorinated paraffin product again subjected in a second stage to the specified chlorination conditions, using additional chlorine in proportions of 0.1 to 0.15 mol chlorine gas per mol of paraffin to obtain 20–30% total chlorination.

The chlorination product comprising a mixture of unchlorinated paraffins and chlorinated paraffins is then to be used for the alkylation step. In some instances, the chloroparaffins can be separated from unchlorinated paraffins prior to alkylation, the unchlorinated paraffins, if desired, being then reused in the chlorination operation. However, such procedure involves some difficulties. Alkyl chlorides are difficultly separable from closely boiling unchlorinated paraffins. Further, distillation results in the splitting out of hydrogen chloride, thereby producing olefins, which in turn produce undesirable polychlorides. Accordingly, it will often be found advantageous to use the whole of the chlorinated product mixture comprising ankyl chlorides and unreasted hydrocarbons as feed to the alkylation zone.

In accordance with the present invention, a superior detergent alkylate is produced by a process which comprises passing n-paraffins boiling in about the range 300–600° F., said normal paraffins having been desorbed after a molecular sieve zeolite treatment to selectively adsorb n-paraffins, together with monochlorinated normal paraffins and an aryl hydrocarbon, for example benzene, into contact with a Friedel-Crafts catalyst in an alkylation zone maintained under alkylation conditions. In the alkylation zone, alkylation between aryl hydrocarbon and monochloroparaffin is effected. Effluent from the alkylation zone is separated, as by fractional distillation, into an alkyl-aromatic, or detergent alkylate fraction, and a paraffin fraction. The paraffin fraction is passed into a chlorination zone, wherein 10–50% of it is chlorinated to alkyl monochlorides or monochloroparaffins. The effluent from the chlorination zone is introduced into the alkylation zone as the above-specified monochloroparaffin.

As hereinabove indicated, in order to insure preparation of monoalkylated aryl hydrocarbon, an excess of aryl compound over monochloroparaffin ranging from about 2 to 25 mols, preferably 5 to 15 mols, per mol of chlorinated paraffin is used. Conveniently, therefore, from the effluent from the reaction zone there is also recovered aryl hydrocarbon which is sent to the alkylation zone, together with make-up aryl hydrocarbon.

Alkylation is effected in the alkylation zone under Friedel-Crafts condensation reaction conditions in the presence of anhydrous aluminum chloride catalyst or other equivalent catalyst. Proportions of aluminum chloride catalyst may range from about 0.05 to 0.5 mols per mol of alkyl chloride or chlorinated paraffin.

The proportion of unchlorinated desorbed paraffin in the alkylation zone can range from about 2 to 10 mols per mol of chlorinated paraffin.

Alkylation temperatures can range from about 100 to 185° F. and higher. As is known in alkylation reactions of the type herein contemplated, greater quantities of catalyst permit lower reaction times. Similarly, higher temperatures permit the use of lesser amounts of catalyst. Time of reaction, which may be continued until hydrogen chloride is no longer evolved, will vary with catalysts concentration and temperature, lower temperatures and catalyst concentrations requiring longer reaction times, an example of a reaction time range being 10 to 30 minutes.

The invention is particularly applicable to an alkylation process wherein the whole of the chlorination product, comprising, for example, 10 to 50, preferably 15 to 30, mol percent alkyl chlorides, and 50 to 90, preferably 70 to 85, mol percent unchlorinated paraffins, is present in the alkylation zone during alkylation. In one embodiment, a quantity of make-up untreated paraffinic material corresponding approximately to that used up in the chlorination operation is added to the alkylation zone. After the alkylation step the alkylate is recovered. The unreacted paraffins are sent to the chlorination zone, chlorinated to the extent desired, and the chlorinated product, again, with make-up untreated paraffins, passed into the alkylation zone.

Moreover, the treating process of the present invention is particularly useful when used in connection with the continuous alkylation process described and claimed in Howard N. Moulden copending application, filed July 3, 1966, Ser. No. 292,578.

According to that application, a continuous two-step process is described and claimed, wherein chloroparaffins and aryl compound in an amount of 2 to 25 mols per mol of chloroparaffin are contacted in a first alkylation zone in the presence of unchlorinated paraffins and red oil catalyst complex produced in a second zone. The mixture of chloroparaffins and unchlorinated paraffins is conveniently the product obtained from chlorinating paraffins to 15–30% chlorination. Contact is effected at a temperature in the range 100–185° F. to effect 90–95% conversion of the chloroparaffins.

Effluent from the first stage alkylation, including hydrogen chloride formed during the first alkylation is then treated to separate a catalyst material phase, and a phase comprising alkylaromatics, paraffins, aryl compound, and dissolved hydrogen chloride. This latter phase then passes into a second stage alkylation zone and therein is contacted with aluminum metal, the amount of metal used being in the range of 0.05 to 0.1 gram atom per mol of chloroparaffin in the original feed. Contact is effected at a temperature in the range 100–185° F. for a period of time of 0.3 to 15 minutes to convert substantially all of the chloroparaffin material entering the second stage alkylation zone.

Effluent from the second alkylation zone now comprising paraffins, aryl compound, alkylaromatics and red oil catalyst is treated to separate the red oil catalyst. This red oil catalyst is then set to the first alkylation zone as the red oil catalyst for that zone. Red oil catalyst is sent to that zone in a quantity approximately equivalent to that withdrawn as spent catalyst after reaction in the first alkylation zone. In general, the red oil volume in both alkylation zones is maintained within a predetermined value in the range of 5 to 25%, based on the total volume of the contents of these zones.

The red oil-free mixture is then fractionally separated. Aryl compound is recovered and reused in the first alkylation zone, together with make-up aryl compound. Alkylaromatics are recovered as product. The paraffins are sent to chlorination after which, adapting the present process to that of Moulden, the chlorination product is fed to the first alkylation zone, together with additional fresh paraffin in a quantity on a molar basis corresponding substantially to that of the alkyl chloride feed entering the first alkylation zone.

Further to illustrate the practice of the present invention, reference is made to the drawing, which is a diagrammatic elevation of apparatus for carrying out a preferred embodiment of the invention.

Referring to the drawing, a Friedel-Crafts condensation of aryl compounds, hereinafter illustrated by benzene, and monochlorinated normal paraffins, which paraffins had been contacted with a molecular sieve zeolite to selectively adsorb n-paraffins, and the n-paraffins then desorbed, is effected in alkylation reactor 1, provided with stirring means 2 in the presence of anhydrous aluminum chloride introduced into reactor 1 through line 3.

During the alkylation, benzene is present in stoichiometric excess, for example 5 to 15 mols of benzene per mol of chlorinated paraffin. In addition, there is present during alkylation 2 to 10 mols of unchlorinated normal paraffin per mol of chlorinated paraffin, said paraffins boiling within about the range 300–600° F. and corresponding to a straight-chain hydrocarbon fraction having a carbon content within the range of 9 to 18 carbon atoms. These normal paraffins having previously been subjected to a molecular zeolite sieve treatment are introduced through line 4 into reactor 1. The quantity of desorbed paraffins introduced through line 4 into reactor 1 will advantageously be approximately equal on a molar basis to the chlorinated hydrocarbons passed into the reactor through line 5.

Friedel-Crafts condensation reaction conditions are maintained in reactor 1. As already stated, these are alkylation temperatures in the range 100–185° F., proportions of aluminum chloride ranging from 0.05 to 0.5 mol per mol of alkyl chloride, and times of reaction varying from 10 to 30 minutes and longer, depending on catalyst concentration and temperature, until hydrogen chloride no longer forms.

Hydrogen chloride gas formed during alkylation is withdrawn through line 6. Line 6 passes through heat exchanger 7 to cool and condense light boiling materials, including benzene, which returns to the reaction zone.

After alkylation, effluent from reactor 1, comprising unreacted benzene, alkylbenzene and paraffins, together with spent catalyst, leaves through line 8 and flows into settler 9. In settler 9, a spent catalyst phase, and a hydrocarbon phase of alkylbenzene, unreacted benzene and normal paraffin are formed. Spent catalyst leaves the settler through line 10. The hydrocarbon phase leaves the settler through line 11 and flows into benzene still 12.

Conditions in benzene still 12 are such as to separate the benzene. Accordingly, all material boiling below about 250° F. leaves still 12 through line 13. Line 13 joins line 14 through which make-up benzene is added in a quantity to maintain the desired concentration in the reaction zone, the total benzene charge entering the alkylation zone through line 15.

The benzene-free hydrocarbon phase now comprising alkylbenzene and unchlorinated paraffins leaves benzene still 12 through line 16 and enters paraffin still 17. In still 17, an alkylbenzene fraction is withdrawn through line 18 and sent to distillation purification to isolate desired detergent alkylate, while the n-paraffins leave through line 19 and flow into chlorinator 20, provided with stirring means 21, wherein they are contacted with chlorine gas entering through line 22. Conditions are such as to insure that the paraffins entering the chlorinator are free of alkylbenzenes.

Conditions in the chlorinator are such as to maximize the formation of monochloroparaffins and minimize the formation of dichlorides. This can be effected by chlorinating to produce 10–50% chlorination, preferably 15 to 30%, by following the conditions hereinabove specified, namely by the use of a temperature in the range 75–250° F., a pressure ranging from atmospheric to 65 p.s.i.a., and quantities of chlorine gas ranging from 0.1 mol to 0.3 mol per mol of entering paraffin.

Effluent from chlorination zone 20 passes through line 23 into chlorine separator 24, which may be an expansion chamber. The hydrogen chloride gas and excess chlorine leave separator 24 through line 25, and the degassed reaction product mixture comprising chloroparaffin and unchlorinated paraffin leaves through line 5 and enters into reactor 1, along with added make-up desorbed paraffins entering through line 4.

As above indicated, a preferred procedure involves the chlorination of a $C_9$–$C_{18}$ paraffin mixture to give a partially chlorinated mixture comprising chlorinated paraffins and a major proportion of unchlorinated paraffins. After alkylation there will, therefore, be produced a mixture comprising alkylaromatics and unchlorinated paraffins. Separation or isolation of the alkylaromatics can be accomplished, using conventional means. One such method involves the selective sulfonation of the aromatic nucleus of the alkylaromatics, leaving the paraffins unsulfonated. The unsulfonated paraffins can then be removed from the sulfonation mixture by solvent extraction, for example with pentane.

However, it will often be found advantageous, as shown in the drawing, to use fractional distillation. When this method is used, clean-cut separations between alkylaromatics, taking benzene as illustrative, and paraffins, because of overlap in boiling ranges, are difficult to obtain where the whole $C_9$–$C_{18}$ paraffin feed has been used in the beginning. For example, $C_9$–$C_{18}$ n-paraffins boil within about the range 300° F. to 605° F.; and the corresponding $C_9$–$C_{18}$ alkylbenzenes, between about 520° F. to 730° F.

It will therefore be found advantageous to start with paraffin feed cuts or fractions of narrower boiling ranges, i.e., paraffin cuts made up of no more than four molecular species, whereby a clean-cut separation of alkylaromatics and paraffins can be effected by distillation. Thus, where the feed is a $C_{10}$–$C_{13}$ fraction, the boiling range will be about 345° F. at 455° F.; for a $C_{11}$–$C_{14}$ fraction, 385° F. to 490° F.; and for a $C_{12}$–$C_{15}$ fraction, 420° F. to 520° F.

Conditions in the first fractionator, benzene still 12, will be such as to separate the benzene. Accordingly, all material boiling below about 250° F. will be removed.

After the first fractionation, paraffin is removed in a second fractionation zone, paraffin still 17, and is recycled to the chlorination zone. Conditions will vary depending on boiling point or boiling point range of the paraffin stock fed to the process. Thus, material will be recycled to the chlorination zone which boils below 460° F. for a $C_{10}$–$C_{13}$ n-paraffin cut; below about 520° F. for a $C_{12}$–$C_{15}$ cut; and below about 490° F. for a $C_{11}$–$C_{14}$ cut.

Light alkylate, that is, alkylate which will not convert into a satisfactory detergent, is next taken off in the alkylbenzene distillation purification section, not shown. This light alkylate will be material having a boiling point range of 460° to 520° F. for a $C_{10}$–$C_{13}$ cut; of 520° to 580° F. for a $C_{12}$–$C_{15}$ cut; and of 490° to 545° F. for a $C_{11}$–$C_{14}$ cut.

Finally, heart-cut alkylate is taken off as the desired fraction. For a $C_{10}$–$C_{13}$ fraction, the desired heart cut will be material having a boiling point range of 520° to 625° F.; for a $C_{11}$–$C_{14}$ fraction, the heart cut will have a boiling point range of 545° to 650° F.; and for a $C_{12}$–$C_{15}$ fraction, the heart cut material will have a boiling range of 580° to 675° F., material boiling higher than 625° F., 650° F., and 675° F. going to heavy alkylate.

Alkylate produced in accordance with the invention is substantially free of contaminants, including chlorides, the presence of which imparts undesirable properties to the final product.

Another advantage of the invention is a more efficient process. Greater utilization of materials is effected by the invention, particularly chlorine. As is known, chlorine does not react quantitatively with the paraffins, and unreacted chlorine inevitably leaves the system along with the hydrogen chloride that is formed during reaction. When practicing the present process, a greater conversion of chlorine to chloroparaffin occurs than with other processes.

To illustrate (a) a portion of essentially normal paraffin feed was sent directly to the chlorination zone and there reacted with chlorine to produce monochloroparaffins. In this case 86.7% of the chlorine was converted. The paraffin feed before chlorination had the following properties:

| | |
|---|---|
| Density, 20/4° C. | 0.7554 |
| Refractive index, $n_D^{20}$ | 1.4238 |
| Aniline point, ° F. | 182.8 |
| Water, p.p.m. | 15–30 |
| Oxygen, p.p.m. | 114+15 |
| Metals, p.p.m. | <0.3 |
| Chlorine, wt. percent | 0 |
| Boiling range, ° F. | ------- |
| Carbon No. distribution, mol percent: | |
| $C_{10}^-$ | 2.4 |
| $C_{11}$ | 19.2 |
| $C_{12}$ | 30.1 |
| $C_{13}$ | 27.6 |
| $C_{14}$ | 18.1 |
| $C_{15}^+$ | 2.6 |
| Avg. molecular weight | 177.0 |
| Bromine No., cg./g. | 0.8 |
| Group type, liquid vol. percent: | |
| Total paraffin | 95.8 |
| Cycloparaffin | 2.8 |
| Aromatics | 1.4 |

(b) A portion of the same normal paraffins as in (a) was first subjected to Friedel-Crafts condensation reaction conditions in the presence of benzene, and monochloroparaffins to produce monoalkylbenzenes. After alkylation and fractionation, the paraffins were recovered and chlorinated under the same conditions as in (a). Chlorine utilization in this case was 94.1%. The properties of the paraffin feed after alkylation and feeding to chlorination were determined. Differences were noted, indicating that the paraffin material was modified in the alkylation zone, and as thus modified, although inexplicably, was responsible for better chlorine utilization. This paraffin feed had the following properties:

| | |
|---|---|
| Density, 20/4° C. | 0.7542 |
| Refractive index, $n_D^{20}$ | 1.4250 |
| Aniline point, ° F. | 183.1 |
| Water, p.p.m. | 40 |
| Oxygen, p.p.m. | ------- |
| Metals, p.p.m. | ------- |
| Chlorine, wt. percent | 0.15 |
| Boiling range, ° F. | 379–493 |
| Carbon No. distribution, mol percent: | |
| $C_{10}^-$ | ------- |
| $C_{11}$ | ------- |
| $C_{12}$ | ------- |
| $C_{13}$ | ------- |
| $C_{14}$ | ------- |
| $C_{15}^+$ | ------- |
| Avg. molecular weight | ------- |
| Bromine No., cg./g. | 0 |
| Group type, liquid vol. percent: | |
| Total paraffin | 96.5 |
| Cycloparaffin | 2.5 |
| Aromatics | 1.0 |

In addition, it has been found that the straight-chain detergent alkylate of the invention is convertible by sulfonation and neutralization into a synthetic detergent which is more biodegradable. The nature of the contaminants that are removed in following the process of the invention is not completely understood. However, it is believed that unknown undesirable impurities or contaminants contributing to biological hardness are taken up in the sludge that is formed in the alkylation zone and removed as spent catalyst.

We claim:

1. In the process for producing biologically soft detergent alkylate involving the steps of contacting a petroleum distillate having a carbon content within the range of 9 to 18 carbon atoms and boiling within about the range 300–600° F. with a molecular sieve zeolite to selectively adsorb normal paraffins, after which the paraffins are desorbed, the desorbed paraffins are reacted with chlorine to produce monochloroparaffins and said monochloroparaffins are condensed in an alkylation zone with an aryl hydrocarbon in the presence of a Friedel-Crafts catalyst following which detergent alkylate is recovered from the effluent of the alkylation zone, the improvement of passing the desorbed paraffins, together with monochloroparaffins and aryl hydrocarbon, into contact with Friedel-Crafts catalyst in the alkylation zone maintained under alkylating conditions, effecting alkylation of monochloroparaffins and aryl hydrocarbon, separating the effluent from the alkylation zone into a detergent alkylate fraction and a paraffin fraction, passing the paraffin fraction into a chlorination zone and there converting 10–50% of the paraffins to monochloroparaffins by reaction with chlorine, and introducing the effluent from the chlorination zone into the alkylation zone as the above-specified monochloroparaffins.

2. Process according to claim 1, wherein 15–30% of the paraffins are converted to monochloroparaffins.

3. Process according to claim 2, wherein the desorbed paraffins are present in the alkylation zone in a proportion within the range of 2 to 10 mols per mol of monochloroparaffin.

4. Process according to claim 3, wherein the aryl compound is benzene and is present in a proportion within the range of 2 to 25 mols per mol of chloroparaffin.

5. Process according to claim 4, wherein the benzene is present in a proportion within the range of 5 to 15 mols per mol of chloroparaffin.

6. In the process for producing biologically soft detergent alkylate involving the steps of contacting a petroleum distillate having a carbon content within the range of 9 to 18 carbon atoms and boiling within about the range of 300–600° F. with a molecular sieve zeolite to selectively adsorb normal paraffins, after which the paraffins are desorbed, the desorbed paraffins are reacted with chlorine to produce monochloroparaffins and said monochloroparaffins are condensed in an alkylation zone with an aryl hydrocarbon in the presence of a Friedel-Crafts catalyst following which detergent alkylate is recovered from the effluent of the alkylation zone, the improvement of passing said monochloroparaffins, together with desorbed paraffins, said monochloroparaffins and desorbed paraffins differing by not more than four molecular species, and benzene into contact with a Friedel-Crafts catalyst in an alkylation zone maintained at a temperature in the range 100° F. to 200° F. until evolution of hydrogen chloride ceases, said benzene and said paraffins being present in proportions, respectively, of 2 to 25 mols and 2 to 10 mols per mol of chloroparaffin, fractionally distilling the effluent from the alkylation zone to separate a detergent alkylate fraction and a paraffin fraction, passing the paraffin fraction into a chlorination zone and there converting 10–50% of the paraffins to monochloroparaffins by reaction with chlorine, and introducing the effluent from the chlorination zone into the alkylation zone as the above-specified monochloroparaffins.

7. Process according to claim 6, wherein the Friedel-Crafts catalyst is anhydrous aluminum chloride and is present in the alkylation zone in an amount of 0.05 to 0.5 mol per mol of chloroparaffin.

8. Process according to claim 7, wherein the benzene is present in proportions of 5 to 15 mols per mol of chloroparaffin and 15 to 30% of the chloroparaffins are converted to monochloroparaffins.

9. Process according to claim 6, wherein the paraffins contain 10 to 13 carbon atoms.

10. Process according to claim 6, wherein the paraffins contain 11 to 14 carbon atoms.

11. Process according to claim 6, wherein the paraffins contain 12 to 15 carbon atoms.

12. Continuous process for producing a biologically soft detergent alkylate which comprises reacting normal paraffinic hydrocarbons having a carbon content within the range 9 to 18 carbon atoms with elemental chlorine in a chlorination zone to produce a reaction product consisting essentially of 10 to 50 volume percent chlorinated paraffins and 50 to 90 volume percent of unchlorinated paraffins, said paraffins being the desorbed product obtained from a molecular zeolite sieve treatment, passing the chlorination product, a substantial molar excess relative to the chlorinated hydrocarbons of an aromatic hydrocarbon and a quantity of added normal paraffinic hydrocarbons approximately equal on a molar basis to the chlorinated hydrocarbons into a first alkylation zone and therein contacting them with a red oil alkylation catalyst complex which is obtained from effluent of the second reaction zone at a temperature in the range 100° to 185° F. to form a reaction product mixture comprising alkylaromatics, hydrogen chloride, unreacted aromatic hydrocarbon, and chloride paraffins, passing said last-mentioned reaction product mixture into a second reaction zone and therein contacting it with aluminum metal at a temperature of 100 to 185° F. until substantially all of the chlorinated paraffin has reacted, separating from the effluent from the second reaction zone a red oil alkylation catalyst complex phase and an organic phase comprising alkylaromatics, unreacted aromatic hydrocarbons and unchlorinated paraffins, passing the red oil alkylation catalyst complex phase into the first reaction zone to supply subtantially all of the red oil alkylation catalyst complex used in that zone, and fractionally distilling the organic phase to separate biologically soft detergent alkylate.

13. Process according to claim 12, wherein the aromatic hydrocarbon is benzene and is present in proportions of 5 to 15 mols per mol of chloroparaffin.

References Cited

UNITED STATES PATENTS

| | | | |
|---|---|---|---|
| 1,995,827 | 3/1935 | Thomas | 260—671 |
| 2,233,408 | 3/1941 | Flett | 260—671 X |
| 2,244,512 | 6/1941 | Brandt | 260—671 X |
| 3,078,322 | 2/1963 | McCaulay | 260—683.51 |
| 3,169,987 | 2/1965 | Bloch | 260—671 X |

OTHER REFERENCES

Concise Chemical and Technical Dictionary, second edition, 1962, Chemical Publishing Company, Inc., New York, page 792.

The Petroleum Dictionary, University of Oklahoma Press, 1952, page 246.

DELBERT E. GANTZ, *Primary Examiner.*

C. R. DAVIS, *Assistant Examiner.*